United States Patent Office 2,895,349
Patented July 21, 1959

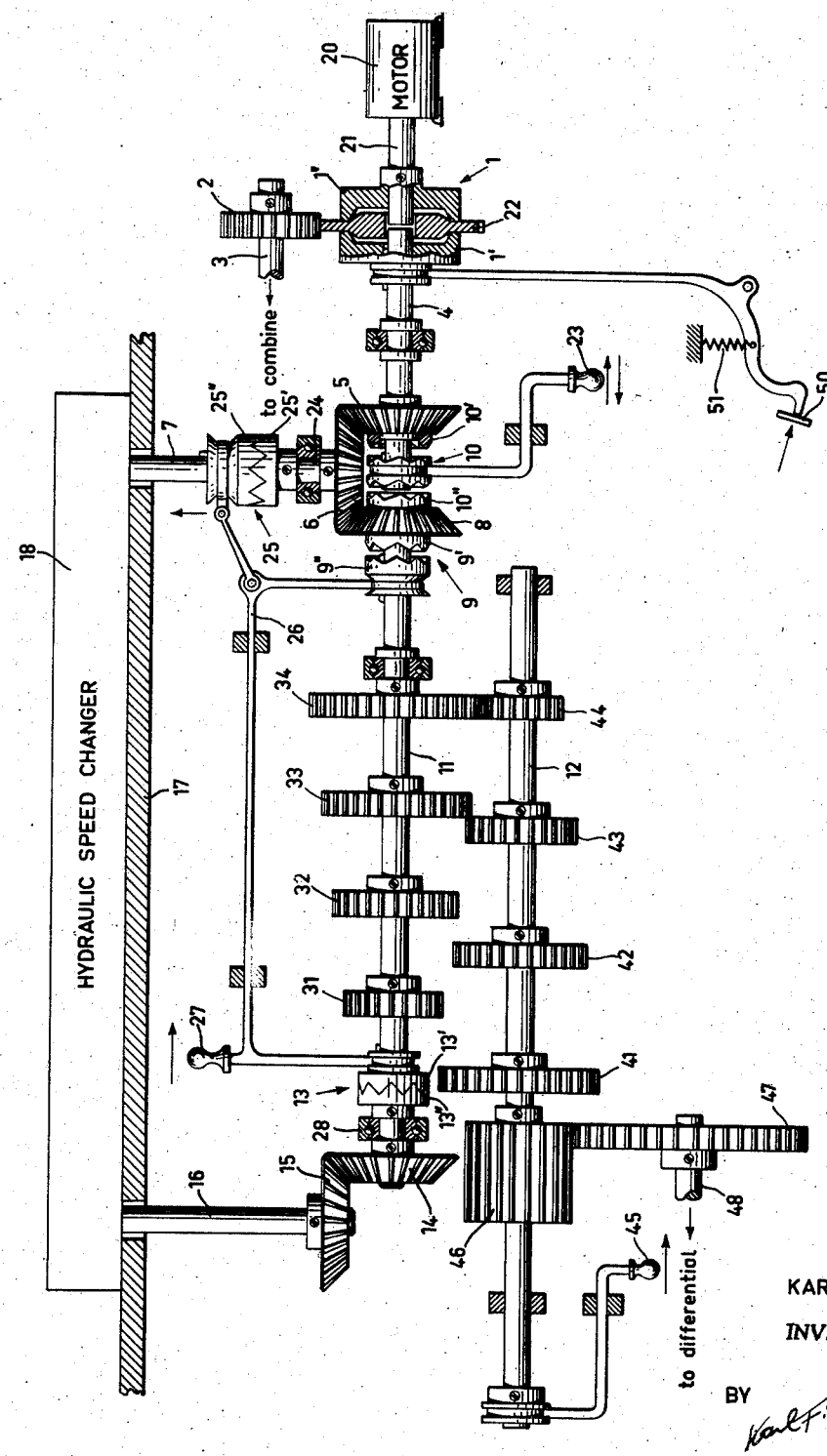

2,895,349

TRANSMISSION SYSTEM FOR AUTOMOTIVE AGRICULTURAL VEHICLES AND THE LIKE

Karl Wehsely, Leipzig, Germany, assignor to Leitburo für Erfindungswesen, Leipzig, Germany, a corporation of Germany Application January 14, 1958, Serial No. 708,872

Claims priority, application Germany April 15, 1957

4 Claims. (Cl. 74—745)

The present invention relates to transmission systems particularly adapted for use in automotive vehicles and other equipment requiring operating speeds which under certain conditions should be continuously variable over a given range and which at other times do not need such adjustability.

In tractor-drawn agricultural machines, such as universal harvester-threshers, it is desirable to have a wide range of adjustability of the driving speed of the tractor relative to the speed of rotation of a load shaft powered by the same motor. Thus, during harvesting, it is necessary to adapt the operating speed of the harvester-thresher or combine to the conditions existing in the field, such as density, height or moisture content of the stalks, in order to prevent clogging of the equipment and to increase the efficiency of its operation. If, however, a continuously variable speed changer such as a hydraulic transmission were permanently inserted in series with the normal gear transmission of the tractor, the notoriously low efficiency of this type of speed changer would make itself felt at all times, hence even when the tractor is used for transportation only or when its load shaft serves as a power source for some other purpose. It is, on the other hand, not practical to utilize two or more gear transmissions in cascade since the increase in bulk and complexity of the mechanism is out of proportion to the added number of speed-changing steps realizable therewith.

The general object of my invention is to provide means enabling the selective insertion of an auxiliary speed changer, preferably one of the continuously variable hydraulic type, between a drive shaft and a driven shaft, in combination with means for directly coupling the two shafts together if the auxiliary speed changer is not so connected.

Another object of this invention is to provide speed-reversing means operatively inserted between the two shafts in such manner as to be effective whether or not the auxiliary speed changer is connected thereto.

A transmission system according to my invention comprises an auxiliary speed changer having an input shaft and an output shaft, a first clutch means selectively operable to couple a drive shaft with either the input shaft of the speed changer or the driven shaft, and a second clutch means adapted to couple the output shaft of the speed changer with the driven shaft when the latter is not connected directly to the drive shaft. Advantageously, the two clutch means include a first and a second jaw clutch respectively positioned at opposite ends of the driven shaft.

According to a more particular feature of the invention, there is provided a train of three gears in permanent mesh of which the central one is selectively connectable by the first clutch means to the input shaft of the speed changer, one of the outer gears being connectable by the same clutch means to the driven shaft when the central gear is disconnected from the said input shaft, and vice versa. A reversing clutch is selectively operable to connect the drive shaft alternatively with one or the other outer gear of the train.

When the system of the invention is used on an automotive vehicle such as a tractor, the differential of the vehicle is preferably connected to a countershaft coupled with the said driven shaft via a conventional gear transmission. A power shaft may in this case be directly coupled with the drive shaft.

The invention will be further described with reference to the accompanying drawing the sole figure of which represents, somewhat schematically, a preferred embodiment.

The shaft 21 of a motor 20 abuts a drive shaft 4 carrying one of the jaws 1' of a double clutch 1 which is slidably keyed thereto, the other clutch jaw 1" being fastened to shaft 21. These two clutch jaws embrace a spur gear 22 which is freely rotatable and shiftable on shaft 4, 21 and meshes with another spur gear 2 fixed to a load shaft 3. The latter shaft may serve as a power source for a combine or other unit entrained by a tractor of which the mechanism shown in the drawing forms a part. A brake pedal 50, when depressed against the force of a spring 51, shifts the clutch jaw 1' to the left, thereby disengaging both the drive shaft 4 and the gear 22 from the motor shaft 21.

Mounted loosely on drive shaft 4 is the first gear 5 of a train of three continuously meshing bevel gears, this gear being provided with clutch piece 10' adapted to be engaged by complementary teeth on one face of the dog 10 which is slidably keyed to shaft 4 and displaceable thereon by means of a handle 23. The teeth on the opposite face of dog 10 are engageable with complementary teeth 10" carried on another member 8 of the train of bevel gears which is freely rotatable on a driven shaft 11. The central member 6 of the gear train, meshing with gears 5 and 8, is secured to a stud shaft 24 which also carries one of the halves 25' of a jaw clutch 25, the other clutch half 25" being slidably keyed to the input shaft 7 of a continuous speed changer 18, e.g. a hydraulic transmission, mounted on a wall 17 of the gear housing. Gear 8 also carries a set of teeth 9' forming part, along with a dog 9" slidably keyed to driven shaft 11, of a jaw clutch 9 which is coupled via a linkage 26 with clutch 25 for simultaneous actuation by means of a handle 27. Linkage 26 also engages a jaw 13' which is slidably keyed to the opposite extremity of drive shaft 11 and, together with its mate 13" fixed to a stud shaft 28, forms part of a jaw clutch 13. A bevel gear 14, fixed to stud shaft 28, meshes with a bevel gear 15 secured to an output shaft 16 of speed changer 18. The linkage 26 interconnects the clutches 9, 13 and 25 in such manner that both clutches 13 and 25 will be closed while clutch 9 is open, as shown on the drawing, and vice versa.

Driven shaft 11 carries a set of stepped gears 31, 32, 33, 34 adapted selectively to engage respective gears 41, 42, 43, 44 on a countershaft 12 which is axially slidable in its bearings with the aid of a handle 45. Also secured to countershaft 12 is an elongated pinion 46 which meshes, in all positions of this shaft, with a spur gear 47 on a transmission shaft or second load shaft 48, the latter leading to the differential of the vehicle. In operation, with the parts in the position shown in the drawing, power from motor 20 will be transmitted to first load shaft 3 but not to shafts 11, 12 and 48 because the reversing dog 10 is not engaged with either clutch face 10' or 10". If the handle 23 is shifted to the right, bevel gear 5 will be positively coupled with drive shaft 4 and will entrain bevel gear 6, thereby rotating the input shaft 7 of speed changer 18 through the intermediary of closed jaw clutch 25. Output shaft 16 will transmit its rotation to driven shaft 11 via closed jaw clutch 13, the latter shaft in turn driving the countershaft 12 and the transmission shaft 48 by way of one of the gears 31—34 mating with the respective gear 41—44. If, on the other hand, handle 23 is shifted to the left, bevel gear 10″ will be positively driven from shaft 4 and will rotate gear 6 as well as input shaft 7 in the opposite direction, the operation being otherwise the same as before.

When the speed changer 18 is no longer required, as when the power shaft 3 is decoupled from its load, the handle 27 is moved to the right and opens the clutches 13 and 25 while engaging the dog 9″ of clutch 9 with the piece 9′ on bevel gear 10″. Depending upon the position of handle 23, driven shaft 11 will either rotate in one or the other direction, according to the engagement of dog 10 with clutch teeth 10′ or 10″, or will be at standstill with dog 10 in its neutral position illustrated. It will thus be seen that under these conditions the system illustrated in the drawing will function in the manner of any conventional automotive gear-shift mechanism.

The invention is, of course, not limited to the specific embodiment shown and described but may be modified in various ways without departing from the spirit and scope of the appended claims.

I claim:

1. A transmission system comprising a drive shaft, a driven shaft, a speed changer having an input shaft and an output shaft, a train of meshing gears, coupling means operatively connecting one of said meshing gears with said drive shaft, first clutch means having a first and a second position for selectively coupling said train with said input shaft and with said driven shaft, respectively, said first clutch means in said first position coupling a second one of said meshing gears with said input shaft while decoupling said train from said driven shaft, said first clutch means in said second position positively coupling one of said meshing gears other than said second one with said driven shaft while decoupling said second one of said meshing gears from said input shaft, and second clutch means operatively linked with said first clutch means for positively coupling said output shaft with said driven shaft in said first position of said first clutch means and for decoupling said driven shaft from said output shaft in said second position.

2. A transmission system according to claim 1, wherein said speed changer comprises hydraulic transmission means.

3. In an automotive vehicle, in combination, a drive shaft, an auxiliary shaft, a driven shaft, co-operating speed-changing gear means on said auxiliary and driven shafts, a secondary speed changer provided with an input shaft and an output shaft, a train of meshing gears, coupling means operatively connecting one of said meshing gears with said drive shaft, first clutch means having a first and a second position for selectively coupling said train with said input shaft and with said auxiliary shaft, respectively, said first clutch means in said first position positively coupling a second one of said meshing gears with said input shaft while decoupling said train from said auxiliary shaft, said first clutch means in said second position positively coupling one of said meshing gears other than said second one with said auxiliary shaft while decoupling said second one of said gears from said input shaft, and second clutch means operatively linked with said first clutch means for positively coupling said output shaft with said auxiliary shaft in said first position of said first clutch means and for decoupling said auxiliary shaft from said output shaft in said second position of said first clutch means.

4. In an automotive vehicle, in combination, a drive shaft, an auxiliary shaft aligned with said drive shaft, a driven shaft parallel to said auxiliary shaft, co-operating speed-changing gear means on said auxiliary and driven shafts, a secondary speed changer provided with an input shaft and an output shaft, a gear train including a central gear and two outer gears, reversing means for selectively coupling either of said outer gears with said drive shaft, first clutch means having a first and a second position for selectively coupling said train with said input shaft and with said auxiliary shaft, respectively, said first clutch means in said first position positively coupling said central gear with said input shaft while decoupling said gear train from said auxiliary shaft, said first clutch means in said second position positively coupling one of said outer gears with said auxiliary shaft while decoupling said central gear from said input shaft, and second clutch means operatively linked with said first clutch means for positively coupling said output shaft with said auxiliary shaft in said first position of said first clutch means and for decoupling said auxiliary shaft from said output shaft in said second position of said first clutch means.

References Cited in the file of this patent

UNITED STATES PATENTS

| | | |
|---|---|---|
| 1,483,245 | Ricardo | Feb. 12, 1924 |
| 1,503,005 | Pope | July 29, 1924 |
| 2,551,396 | Roosevelt | May 1, 1951 |